United States Patent
Pahwa et al.

(10) Patent No.: US 11,216,191 B2
(45) Date of Patent: Jan. 4, 2022

(54) STORAGE DEVICE AND OPERATING METHOD OF STORAGE DEVICE

(71) Applicant: Samsung Electronics Co., Ltd., Suwon-si (KR)

(72) Inventors: Shiva Pahwa, Hwaseong-si (KR); Alex Mohandas, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 16/806,287

(22) Filed: Mar. 2, 2020

(65) Prior Publication Data

US 2020/0393975 A1  Dec. 17, 2020

(30) Foreign Application Priority Data

Jun. 14, 2019 (KR) .................. 10-2019-0070923

(51) Int. Cl.
*G06F 3/06* (2006.01)
*G06F 12/0804* (2016.01)

(52) U.S. Cl.
CPC .......... *G06F 3/0619* (2013.01); *G06F 3/0659* (2013.01); *G06F 3/0679* (2013.01); *G06F 12/0804* (2013.01); *G06F 2212/1032* (2013.01)

(58) Field of Classification Search
CPC ..................................................... G06F 3/0641
See application file for complete search history.

(56) References Cited

U.S. PATENT DOCUMENTS

| | | |
|---|---|---|
| 7,403,137 B1 | 7/2008 | Huang |
| 7,747,821 B1 | 6/2010 | Singh et al. |
| 8,667,215 B2 | 3/2014 | Marotta et al. |
| 8,825,941 B2 | 9/2014 | Moshayedi et al. |
| 9,280,287 B2 | 3/2016 | Seo et al. |
| 9,582,222 B2 | 2/2017 | Yang et al. |
| 9,584,155 B1 | 2/2017 | Gopal et al. |
| 2008/0005141 A1* | 1/2008 | Zheng ................... G06F 3/0641 |
| 2013/0343181 A1 | 12/2013 | Stroud et al. |
| 2013/0347103 A1 | 12/2013 | Veteikis et al. |
| 2016/0365874 A1* | 12/2016 | Nagashima ......... G06F 11/1076 |
| 2017/0083581 A1* | 3/2017 | Kozlovsky .......... G06F 16/1752 |
| 2019/0102346 A1 | 4/2019 | Wang et al. |
| 2019/0179536 A1* | 6/2019 | Estrada ............... G06F 11/1076 |
| 2019/0332492 A1* | 10/2019 | Marelas ................. H04L 63/12 |
| 2020/0019623 A1* | 1/2020 | Wong .................. G06F 16/9027 |

* cited by examiner

*Primary Examiner* — Edward J Dudek, Jr.
(74) *Attorney, Agent, or Firm* — Muir Patent Law, PLLC

(57) ABSTRACT

A storage device includes a nonvolatile memory device, and a controller that receives a write command, data, and a signature associated with the data from an external device, generates a first hash value from the data, generates a second hash value from the signature, generates an output hash value based on the first hash value and the second hash, and detects whether the data received from the external device are previously written in the nonvolatile memory device, by using the output hash value.

20 Claims, 13 Drawing Sheets

STORAGE DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2019-0070923 filed on Jun. 14, 2019, in the Korean Intellectual Property Office, the disclosure of which is incorporated by reference herein in its entirety.

BACKGROUND

Embodiments of the inventive concept described herein relate to a semiconductor device, and more particularly, relate to a storage device having an improved lifespan by making the wear slow while maintaining reliability and an operating method of the storage device.

A storage device refers to a device that stores data under control of a host device such as a computer, a smart phone, a smart pad, or the like. The storage device includes a device, which stores data on a magnetic disk, such as a hard disk drive (HDD), or a device, which stores data in a semiconductor memory, in particular, a nonvolatile memory, such as a solid state drive (SSD) or a memory card.

The nonvolatile memory includes a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM), etc.

The nonvolatile memory of the storage device may include memory cells and may store data by changing states of the memory cells. As the number of times that data are written in memory cells increases, the reliability of the memory cells may decrease. This phenomenon may be considered as memory cells are worn out.

When the reliability of the memory cells decreases to a given level or lower, the nonvolatile memory does not secure the reliability of data any longer. That is, there is required a technology for making the wear of memory cells slow for the purpose of extending the lifespan of the nonvolatile memory and the storage device.

SUMMARY

Embodiments of the inventive concept provide a storage device having an improved lifespan by making the wear of memory cells slow while maintaining the reliability of data and an operating method of the storage device.

According to an exemplary embodiment, a storage device includes a nonvolatile memory device, and a controller that receives a write command, data, and a signature associated with the data from an external device, generates a first hash value from the data, generates a second hash value from the signature, and generates an output hash value based on the first hash value and the second hash value. The controller detects whether the data received from the external device is previously written in the nonvolatile memory device, by using the output hash value.

According to an exemplary embodiment, an operating method of a storage device which includes a nonvolatile memory device and a controller configured to control the nonvolatile memory device includes receiving, by the controller, a write command, data, and a signature associated with the data from an external device, generating, by the controller, an output hash value from the data and the signature, skipping, by the controller, an operation of writing the data in the nonvolatile memory device when a similarity between the output hash value and previous output hash value of data previously written in the nonvolatile memory device is a threshold value or greater than the threshold value, and writing, by the controller, the data in the nonvolatile memory device when the similarity between the output hash value and the previous output hash value previously written in the nonvolatile memory device is smaller than the threshold value.

According to an exemplary embodiment, a storage device includes a nonvolatile memory device, and a controller that controls the nonvolatile memory device. The controller includes a reception block that receives a write command, a logical address, data, and a signature associated with the data from an external device, a signature check block that receives the data and the signature from the reception block and checks an integrity of the data by using the signature, a hash generation block that receives the data and the signature from the signature check block and generates an output hash value from the data and the signature, a hash data block that stores previous output hash value associated with previous data previously written in the nonvolatile memory device, a mapping information block that stores mapping information between a previous logical address of the previous data and a previous physical address, at which the previous data are written, of a storage space of the nonvolatile memory device, and a control block that receives the data and the output hash value from the hash generation block, determines a similarity by comparing the output hash value and the previous output hash value of the hash data block, and determines one of a write data hit and a write data miss depending on the similarity. When the write data hit is determined, the control block updates the mapping information block such that the logical address of the data is mapped onto the previous physical address of the previous data. When the write data miss is determined, the controller writes the data in the nonvolatile memory device and updates the mapping information block such that the logical address is mapped onto a physical address, at which the data are written, of a storage space of the nonvolatile memory device.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept may be described in detail and clearly to such an extent that an ordinary one in the art easily implements the inventive concept.

Figure 1:
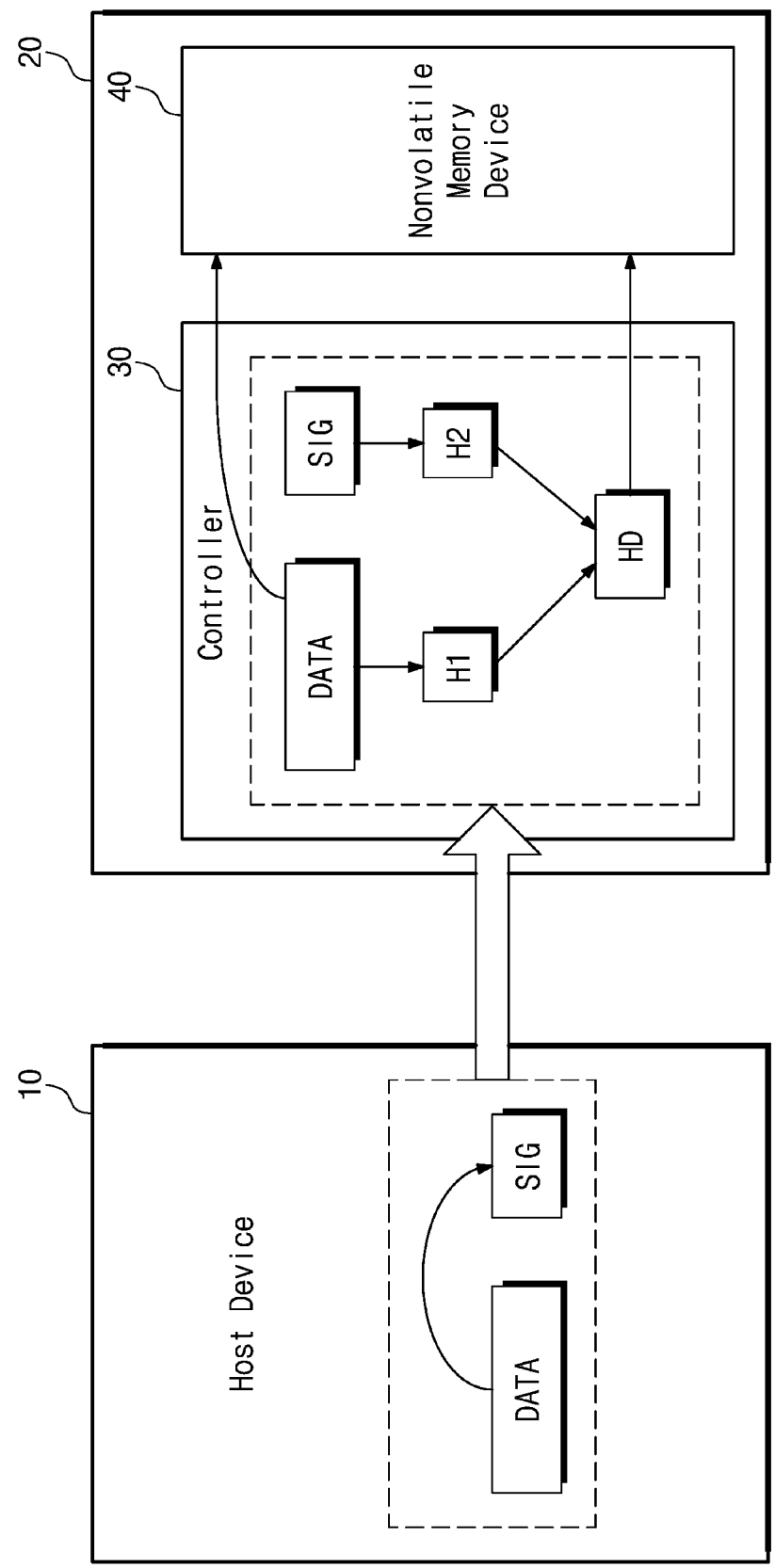
FIG. 1 is a block diagram illustrating a computing system according to some embodiments of the inventive concept.

FIG. 1 is a block diagram illustrating a computing system according to some embodiments of the inventive concept. Referring to FIG. 1, the computing system includes a host device 10 and a storage device 20. The host device 10 may include various computing devices such as a computer, a notebook computer, a smartphone, a smart pad, and a smart watch.

The storage device 20 is connected to the host device 10. The storage device 20 is configured to store data in response to a request of the host device 10. In response to a request of the host device 10, the storage device 20 is configured to read the stored data and output the read data to the host device 10. The storage device 20 may include a hard disk drive (HDD), a solid state drive (SSD), an embedded storage device, a portable memory, etc.

The storage device 20 may include a controller 30 and a nonvolatile memory device 40. The controller 30 may write data in the nonvolatile memory device 40 in response to a request of the host device 10. In response to a request of the host device 10, the controller 30 may read data from the nonvolatile memory device 40 and may provide the read data to the host device 10. The controller 30 may perform various operations for managing the nonvolatile memory device 40 or the storage device 20.

Even though a power is turned off, the nonvolatile memory device 40 may maintain data that are previously written. The nonvolatile memory device 40 may include a flash memory, a phase-change memory access memory device (PRAM), a magnetic RAM (MRAIVI), a resistive RAM (RRAM), a ferroelectric RAM (FRAM), etc.

When the host device 10 writes data "DATA" in the storage device 20, the host device 10 may generate a signature SIG from the data "DATA". The size of the signature SIG may be smaller than the size of the data "DATA". The host device 10 may transmit the data "DATA" and the signature SIG to the storage device 20 together with a write command and an address (e.g., a logical address).

The controller 30 of the storage device 20 may receive the data "DATA" and the signature SIG from the host device 10 together with the write command and the logical address. The controller 30 may generate a first hash H1 (or, a first hash value H1) from the data "DATA" and may generate a second hash H2 (or, a second hash value H2) from the signature SIG. The size of the first hash H1 may be smaller than the size of the data "DATA", and the size of the second hash H2 may be smaller than the signature SIG.

Because the first hash H1 is generated from the data "DATA", the first hash H1 may include a unique characteristic of the data "DATA". Because the second hash H2 is generated from the signature SIG and the signature SIG is generated from the data "DATA", the second hash H2 may include a unique characteristic of the data "DATA".

The controller 30 may generate hash data HD (or, an output hash value HD) from the first hash H1 and the second hash H2. Because the hash data HD are generated from the first hash H1 and the second hash H2, the hash data HD may include the unique characteristic of the data "DATA".

The controller 30 may prevent a redundant (or duplicable) write operation by using the hash data HD. For example, the controller 30 may compare the hash data HD (e.g., current hash data) with hash data (e.g., previous hash data) of written data (e.g., previous data) before writing the current hash data HD in the nonvolatile memory device 40.

When the hash data HD are the same as the previous hash data, the controller 30 may determine that the data "DATA" are the same as the previous data and a write operation associated with the data "DATA" is a redundant write operation. In this case, the controller 30 may store information indicating that the data "DATA" are present in the nonvolatile memory device 40 as previous data, without writing the data "DATA" in the nonvolatile memory device 40.

When the hash data HD are different from the previous hash data, the controller 30 may determine that the data "DATA" are different from the previous data. In this case, the controller 30 may write the data "DATA" in the nonvolatile memory device 40 and may store an address (e.g., a physical address), at which the data "DATA" are written, of a storage space of the nonvolatile memory device 40.

According to the inventive concept, the same data are prevented from being redundantly written in the nonvolatile memory device 40. Accordingly, the wear of the nonvolatile memory device 40 may progress slowly, and the lifespan of the nonvolatile memory device 40 and the storage device 20 may be extended.

Also, according to the inventive concept, the hash data HD are generated from the data "DATA" and the signature SIG. Accordingly, compared with the case where hash data are generated only from the data "DATA", the hash data HD may include more unique characteristics of the data "DATA".

When a level indicating the characteristic of the data "DATA" is smaller than a particular value, the same hash data HD may be generated from pieces of different data. In this case, even when the data "DATA" are different from the previous data, the data "DATA" may not be written in the nonvolatile memory device 40 by a redundant write prevention technique. That is, the data "DATA" may be lost.

As described with reference to FIG. 1, when the hash data HD are generated from both the data "DATA" and the signature SIG, a level indicating the characteristic of the data "DATA" that the hash data HD indicate may be the particular value or more. Accordingly, even though the redundant write prevention technique is applied, the data "DATA" are prevented from being lost, and the reliability of the storage device 20 is maintained or improved.

The signature SIG may refer to various forms of information generated from the data "DATA". For example, the signature SIG may be information that is used to check the integrity of the data "DATA", and may include a cyclic redundancy check (cyclic redundancy check) code, a checksum code, an error detection code (EDC), an error correction code (ECC), etc. The signature SIG may be information indicating the characteristic of the data "DATA" and may include a hash value.

Some embodiments are illustrated in FIG. 1 as the data "DATA" and the hash data HD are written in the nonvolatile memory device 40. When the data "DATA" are not associated with the redundant write operation, the data "DATA" may be written in the nonvolatile memory device 40. The hash data HD may be written in the nonvolatile memory device 40 for a back-up operation.

Figure 2:
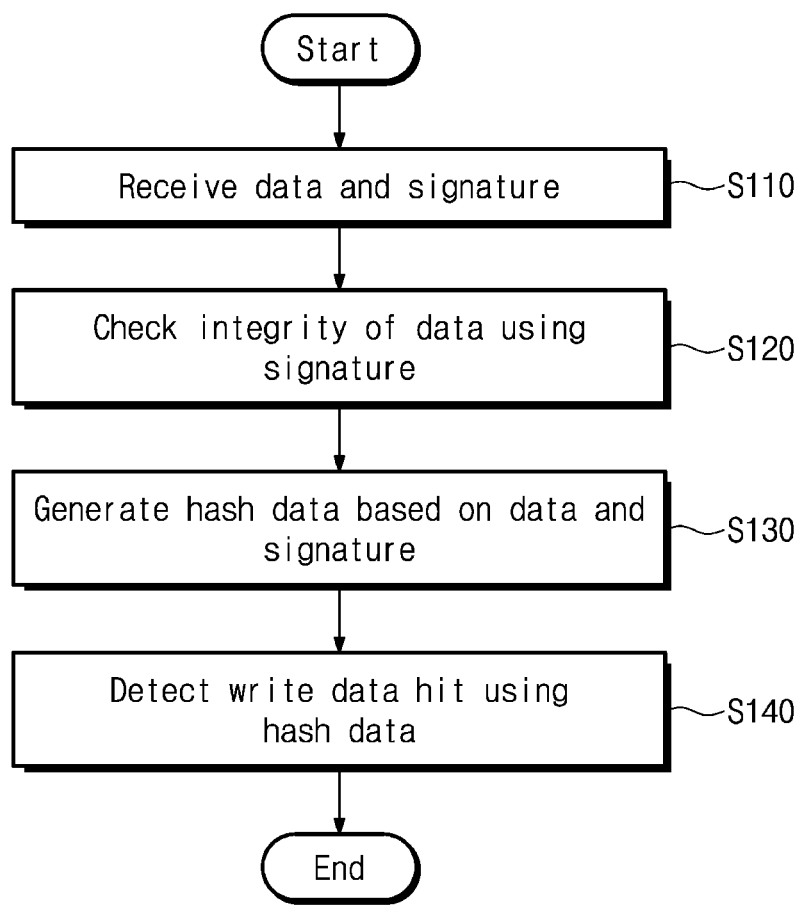
FIG. 2 is a flowchart illustrating an operating method of a storage device of FIG. 1 according to example embodiments.

FIG. 2 is a flowchart illustrating an operating method of the storage device 20 of FIG. 1 according to example embodiments. Referring to FIGS. 1 and 2, in operation S110, the controller 30 of the storage device 20 may receive the data "DATA" and the signature SIG from the host device 10 together with a write command and a logical address.

In operation S120, the controller 30 may check the integrity of the data "DATA" by using the signature SIG. When a fault is present in the data "DATA", the controller 30 may correct the fault or may request the host device 10 to retransmit the data "DATA".

When the fault is absent from the data "DATA" or is corrected, operation S130 is performed. In operation S130, the controller 30 may generate the hash data HD based on the data "DATA" and the signature SIG. In operation S140, the controller 30 may detect a write data hit by using the hash data HD.

For example, when the hash data HD are the same as previous hash data, the controller 30 may determine that the data "DATA" are the same as previous data and may detect the write data hit. When the hash data HD are different from the previous hash data, the controller 30 may determine that the data "DATA" are different from the previous data and may detect the write data miss.

Figure 3:
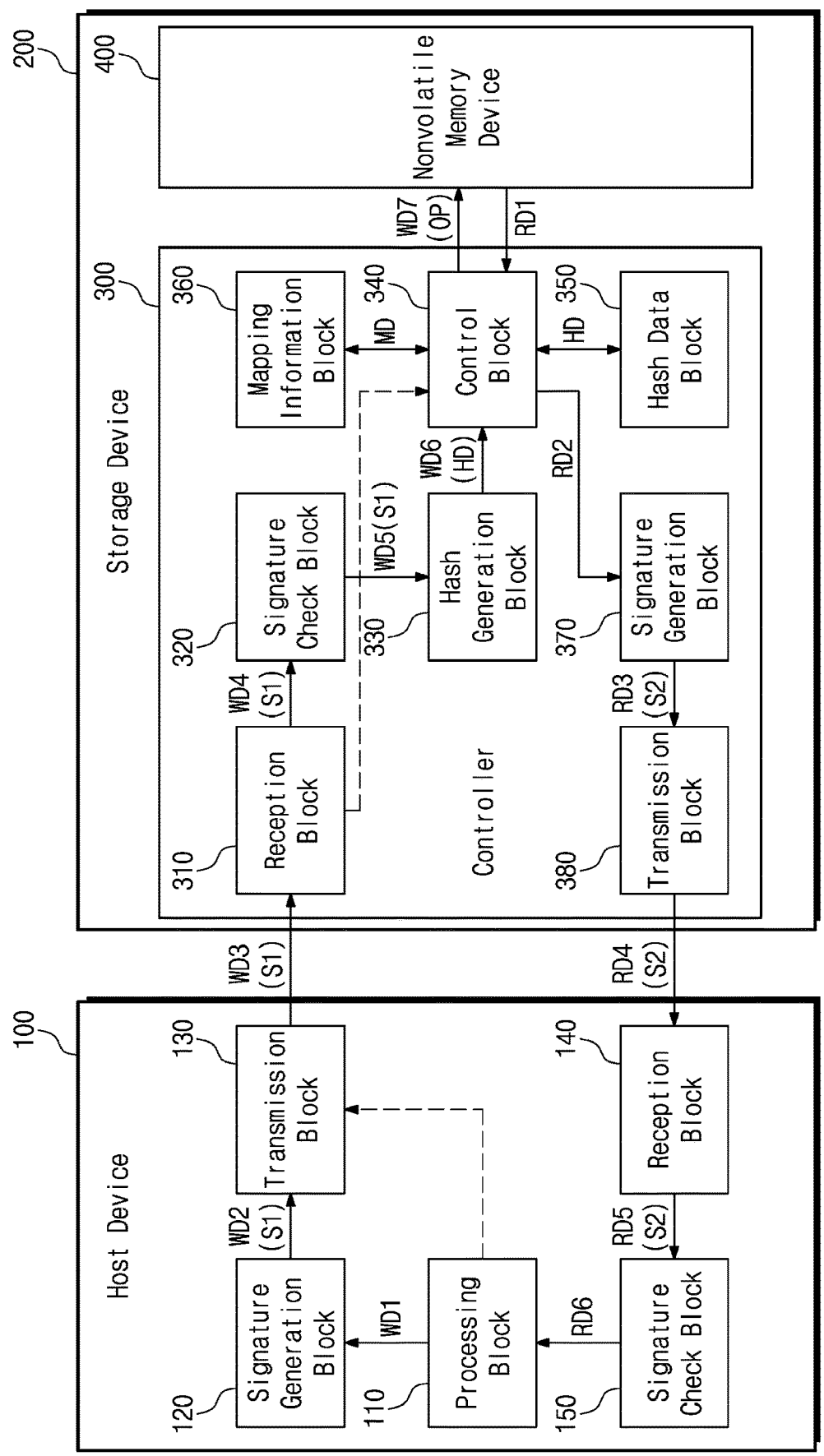
FIG. 3 is a block diagram illustrating a computing system of FIG. 1 in particular, according to example embodiments.

FIG. 3 is a block diagram illustrating the computing system of FIG. 1 in particular, according to example embodiments. Referring to FIG. 3, the computing system includes a host device 100 and a storage device 200.

The host device 100 may correspond to the host device 10 of FIG. 1. The host device 100 may include a processing block 110, a signature generation block 120, a transmission block 130, a reception block 140, and a signature check block 150.

The processing block 110 may include upper layers of the host device 100, such as an application, an operating system, and a device driver. The processing block 110 may include a central processing unit (CPU) or an application processor (AP) implemented with an integrated circuit and a plurality of software executable by the central processing unit or the application processor.

Write Operation of Host Device 100

In a write operation in which data are written in the storage device 200, the processing block 110 may generate first write data WD1. The processing block 110 may provide the first write data WD1 to the signature generation block 120.

The signature generation block 120 may generate a first signature S1 from the first write data WD1 including data. The data may correspond to the data "DATA" described with reference to FIGS. 1 and 2. The first signature S1 may correspond to the signature SIG described with reference to FIGS. 1 and 2. The signature generation block 120 may provide the transmission block 130 with the second write data WD2 including the data and the first signature S1.

The transmission block 130 may convert the second write data WD2 including the data and the first signature S1 into third write data WD3 in compliance with a communication protocol between the host device 100 and the storage device 200. The transmission block 130 may transmit a write command and a logical address, which are provided from the processing block 110, to the storage device 200 together with the third write data WD3. For example, a dotted arrow indicates a path where the write command and the logical address are transferred.

Read Operation of Host Device 100

In a read operation where data are read from the storage device 200, the processing block 110 may provide a read command and a logical address to the transmission block 130. For example, the dotted arrow also indicates a path where the read command and the logical address are transferred. The transmission block 130 may transmit the read command and the logical address to the storage device 200. In response to the read command and the logical address, the storage device 200 may output fourth read data RD4 including data and a second signature S2.

The reception block 140 may receive the fourth read data RD4 including the data and the second signature S2 from the storage device 200. The reception block 140 may convert the fourth read data RD4 including the data and the second signature S2 into fifth read data RD5 in compliance with an internal communication protocol of the host device 100. The reception block 140 may provide the signature check block 150 with the fifth read data RD5 including the data and the second signature S2.

The signature check block 150 may identify the data and the second signature S2 from the fifth read data RD5. The signature check block 150 may check the integrity of the data by using the second signature S2. When a fault is absent from the data or the fault is corrected, the signature check block 150 may provide the processing block 110 with sixth read data RD6 including the data.

When a fault is present in the data or the fault is uncorrectable, the signature check block 150 may notify the processing block 110 that a read fail occurs. The processing block 110 may perform a follow-up process corresponding to the read fail depending on a read fail processing algorithm.

The storage device 200 may correspond to the storage device 20 of FIG. 1. The storage device 200 may include a controller 300 and a nonvolatile memory device 400. The controller 300 may correspond to the controller 30 of FIG. 1, and the nonvolatile memory device 400 may correspond to the nonvolatile memory device 40 of FIG. 1.

The controller 300 may include a reception block 310, a signature check block 320, a hash generation block 330, a control block 340, a hash data block 350, a mapping information block 360, a signature generation block 370, and a transmission block 380.

Write Operation of Storage Device 200

When a write operation is triggered as the third write data WD3 including data and the first signature S1 are received from the host device 100 together with a write command and a logical address, the reception block 310 may convert the third write data WD3 including the data and the first signature S1 into fourth write data WD4 in compliance with an internal communication protocol of the controller 300.

The reception block 310 may provide the signature check block 320 with the fourth write data WD4 including the data and the first signature S1. Also, the reception block 310 may provide the write command and the logical address to the control block 340. For example, a dotted arrow indicates a path where the write command and the logical address are transferred.

The signature check block 320 may identify the data and the first signature S1 from the fourth write data WD4. The signature check block 320 may check the integrity of the data by using the first signature S1. When a fault is absent from the data or the fault is corrected, the signature check block 320 may provide the hash generation block 330 with fifth write data WD5 including the data and the first signature S1. When a fault is present in the data and the fault is uncorrectable, the controller 300 may request retransmission to the host device 100 or may inform a transmission error to the host device 100.

The hash generation block 330 may generate the hash data HD from the fifth write data WD5 including the data and the first signature S1. The hash generation block 330 may provide the control block 340 with sixth write data WD6 including the data and the hash data HD.

The control block 340 may search the hash data block 350 by using the hash data HD. The hash data block 350 may store hash data (previous hash data) of data (previous data) previously written in the nonvolatile memory device 400. The control block 340 may determine whether the previous hash data are the same as the hash data HD.

When the previous hash data are the same as the hash data HD, the control block 340 may determine a write data hit. For example, data that are written in each write operation may be one data chunk, and hash data that are generated from one data chunk may be one hash data chunk.

When a plurality of write operations are previously performed, a plurality of data chunks are written in the nonvolatile memory device 400, and a plurality of hash data chunks are stored in the hash data block 350. When one hash data chunk of the plurality of hash data chunks is the same as the hash data HD, the control block 340 may determine a write data hit.

When a hash data chunk that is the same as the hash data HD is absent from the plurality of hash data chunks, the control block 340 may determine a write data miss. When the write data miss is determined, the control block 340 may write seventh write data WD7 including the data in the nonvolatile memory device 400.

When the write data hit is determined, the control block 340 may skip an operation of writing the seventh write data WD7 including the data in the nonvolatile memory device 400. Accordingly, the write operation associated with the seventh write data WD7 may be an option OP. For example, the seventh write data WD7 may have a form that is converted in compliance with a protocol for communicating with the nonvolatile memory device 400.

The mapping information block 360 may store a logical address received from the host device 100 in each write operation, a physical address of the nonvolatile memory device 400 where data are written, and a location (e.g., an address of a storage space) of the hash data block 350, at which corresponding hash data (e.g., one hash data chunk) are stored, in a state of being mapped onto each other.

When the write data miss is determined, the control block 340 may store (or add) the hash data HD in the hash data block 350. The control block 340 may store a physical address of the nonvolatile memory device 400, at which the seventh write data WD7 are written, and information of a location where the hash data HD are stored, in the mapping information block 360 in association with the logical address received from the host device 100.

When the write data hit is determined, the control block 340 may not store (or add) the hash data HD in the hash data block 350. The control block 340 may store a physical address of the nonvolatile memory device 400, at which previous data are written, and information of a location where previous hash data are stored, in the mapping information block 360 in association with the logical address received from the host device 100.

Read Operation of Storage Device 200

When a read operation is triggered as a read command and a logical address are received from the host device 100, the reception block 310 may provide the read command and the logical address to the control block 340. For example, the dotted arrow also indicates a path where the read command and the logical address are transferred.

The control block 340 may search for a physical address associated with the logical address received from the host device 100, with reference to the mapping information block 360. The control block 340 may read first read data RD1 including data from the nonvolatile memory device 400 by using the physical address.

The control block 340 may convert the first read data RD1 including the data into second read data RD2 in compliance with the internal communication protocol of the controller 300. The control block 340 may provide the second read data RD2 including the data to the signature generation block 370.

The signature generation block 370 may generate the second signature S2 from the second read data RD2. The signature generation block 370 may provide the transmission block 380 with third read data RD3 including the data and the second signature S2.

The transmission block 380 may convert the third read data RD3 including the data and the second signature S2 into the fourth read data RD4 in compliance with the communication protocol between the host device 100 and the storage device 200. The transmission block 380 may transmit the fourth read data RD4 including the data and the second signature S2 to the host device 100.

In some embodiments, the hash data block 350 may be implemented to be stored in a random access memory that is provided inside or outside the controller 300. Information of the mapping information block 360 may be stored in a random access memory such as a dynamic random access memory (DRAM) or a static random access memory (SRAM) that is provided inside or outside the controller 300. Information of the hash data block 350 and the mapping information block 360 may be stored in the same memory or in different memories.

Figure 4:
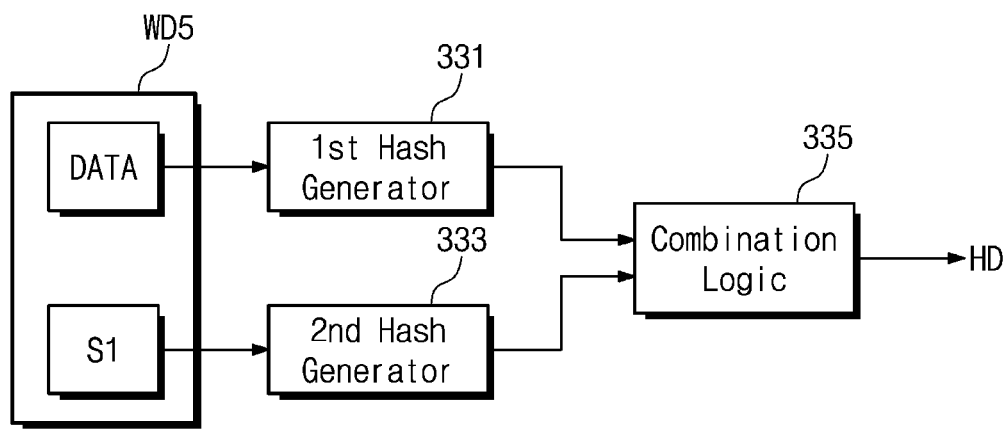
FIG. 4 is a block diagram illustrating an example of a hash generation block of a controller in a storage device according to example embodiments.

FIG. 4 is a block diagram illustrating an example of the hash generation block 330 of the controller 300 in the storage device 200 according to example embodiments. Referring to FIGS. 3 and 4, the hash generation block 330 may receive the fifth write data WD5 including the data "DATA" and the first signature S1.

The hash generation block 330 may include a first hash generator 331, a second hash generator 333, and a combination logic 335.

The first hash generator 331 may generate the first hash H1 through a hash operation of applying a hash function to the data "DATA". The size of the first hash H1 may be smaller than the size of the data "DATA".

The second hash generator 333 may generate the second hash H2 through a hash operation of applying a hash function to the first signature S1. The size of the second hash H2 may be smaller than the size of the first signature S1.

The combination logic 335 may combine the first hash H1 and the second hash H2 to generate the hash data HD. For example, the combination logic 335 may generate the hash data HD by arranging the first hash H1 and the second hash H2 sequentially or in a reverse order or performing a hash operation of applying a hash function to an arranged result.

For another example, the combination logic 335 may generate the hash data HD by performing a logical operation (e.g., an exclusive OR operation) to the first hash H1 and the second hash H2 or performing a hash operation of applying a hash function to a result of performing the logical operation.

Figure 5:
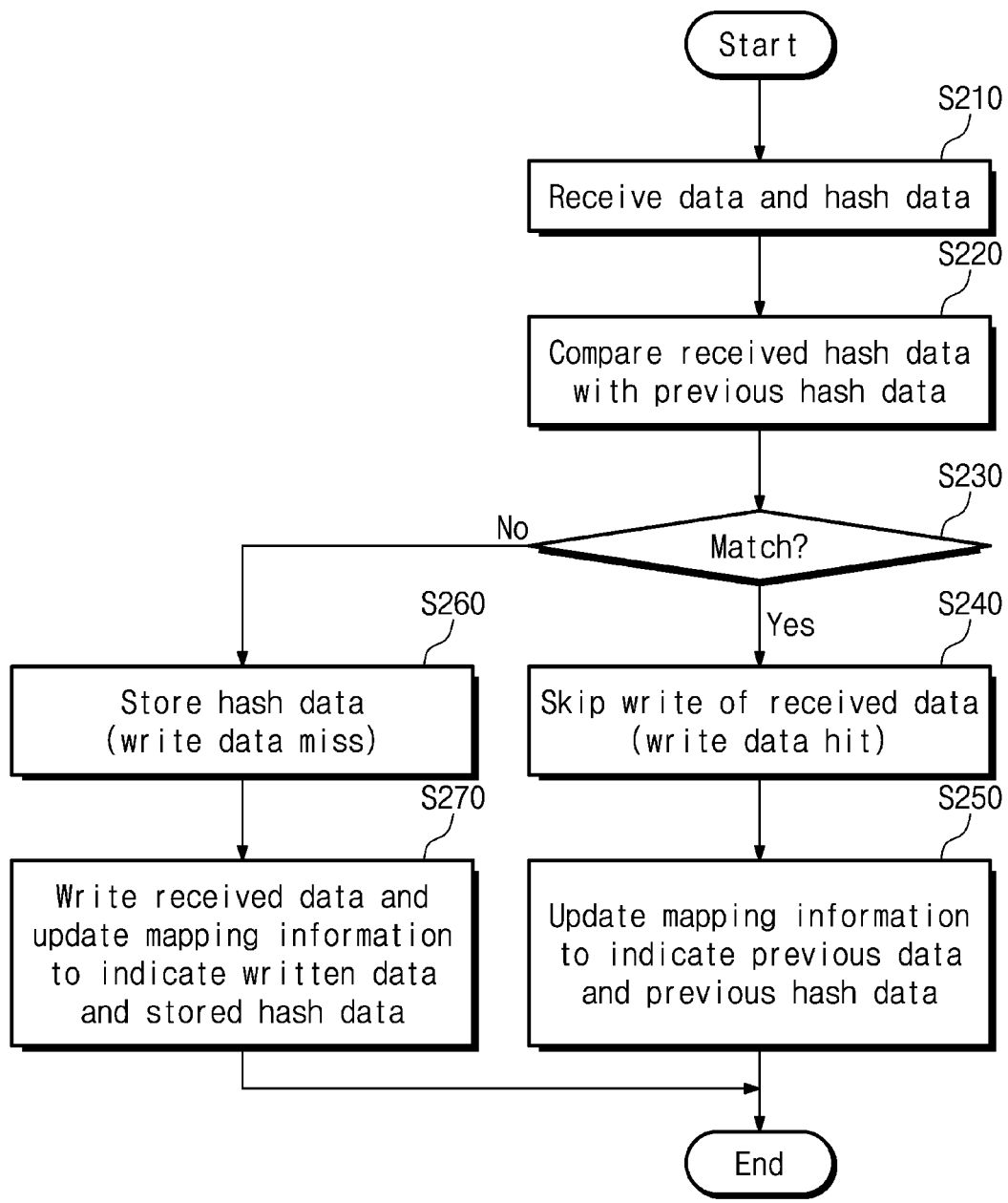
FIG. 5 is a flowchart illustrating an example of a method in which a control block determines a write data hit or a write data miss, according to example embodiments.

FIG. 5 is a flowchart illustrating an example of a method in which the control block 340 determines a write data hit or a write data miss, according to example embodiments. Referring to FIGS. 3 and 5, in operation S210, the control block 340 of the controller 300 in the storage device 200 may receive the sixth write data WD6 including data and the hash data HD from the hash generation block 330.

In operation S220, the control block 340 may compare the received hash data HD with previous hash data stored in the hash data block 350. In operation S230, the control block 340 may determine whether the hash data HD are matched with the previous hash data.

For example, when a similarity between the hash data HD and the previous hash data (e.g., the number of identical bits or a ratio of identical bits) is a threshold value or greater than the threshold value, the control block 340 may determine a write data hit and may perform operation S240. When the similarity between the hash data HD and the previous hash data is smaller than threshold value, the control block 340 may determine a write data miss and may perform operation S260. For example, the threshold value may be set such that a write data hit is determined when the hash data HD are the same as the previous hash data.

When the write data hit is determined, in operation S240, the control block 340 may determine the write data hit. The control block 340 may skip a write operation associated with the received data, that is, an operation of writing the received data in the nonvolatile memory device 400 and may discard the data and the hash data HD. For example, the control block 340 may discard the data or the hash data HD by releasing a storage space allocated to the data or the hash data HD.

In operation S250, the control block 340 may update mapping information of the mapping information block 360 so as to indicate previous data and previous hash data. For example, the control block 340 may store a physical address of the nonvolatile memory device 400, at which previous data are written, and information of a location where previous hash data are stored, in the mapping information block 360 associated with the logical address received from the host device 100.

When the write data miss is determined, in operation S260, the control block 340 may determine the write data miss. The control block 340 may store the hash data HD in the hash data block 350. In operation S270, the control block 340 may write the received data in the nonvolatile memory device 400 and may update mapping information of the mapping information block 360 so as to indicate the written data and the stored hash data HD.

Figure 6:
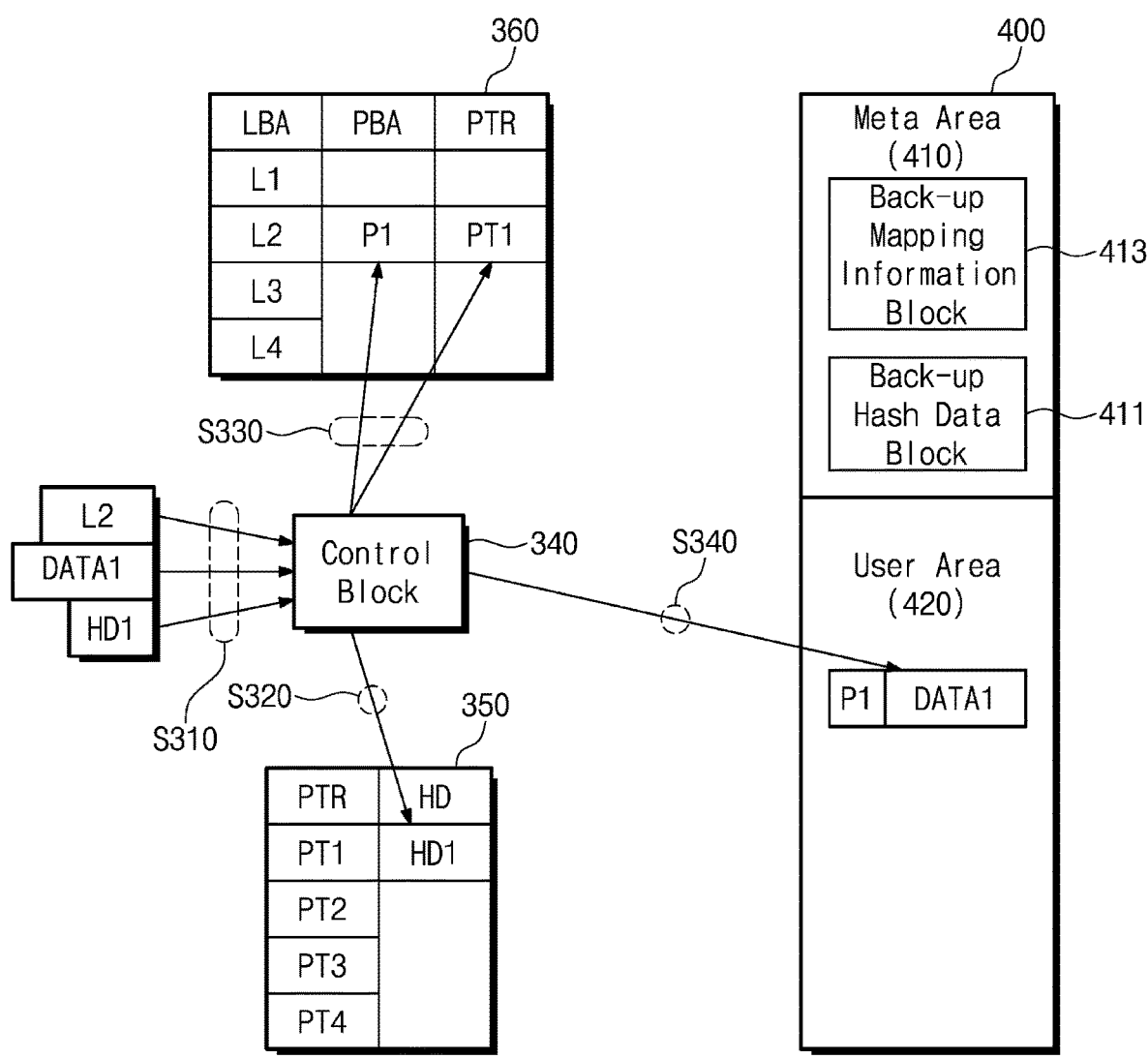
FIG. 6 illustrates an example in which a write data miss occurs in a storage device in a write operation, according to example embodiments.

FIG. 6 illustrates an example in which a write data miss occurs in the storage device 200 in a write operation, according to example embodiments. To prevent a drawing from becoming unnecessarily complicated, the control block 340, the hash data block 350, the mapping information block 360, and the nonvolatile memory device 400 are illustrated.

Referring to FIGS. 3 and 6, the hash data block 350 may be configured to store the hash data HD at locations (e.g., locations of a storage space) identified by first to fourth pointers PT1 to PT4 that are exemplified as a pointer PTR.

The mapping information block 360 may be configured to store the pointer PTR and a physical address PBA at locations (e.g., locations of a storage space) identified by first to fourth logical addresses L1 to L4 that are exemplified as a logical address LBA.

The nonvolatile memory device 400 may include a meta area 410 and a user area 420. The storage device 200 may open the user area 420 to the host device 100 as a storage space of the storage device 200. The storage device 200 may use the meta area 410 for the purpose of storing various information necessary to operate the storage device 200.

In some embodiments, the meta area 410 may be used to store information of a back-up hash data block 411 and a back-up mapping information block 413. For example, the control block 340 of the controller 300 in the storage device 200 may back up the hash data block 350 and the mapping information block 360 to the meta area 410 as the back-up hash data block 411 and the back-up mapping information block 413, for example, at an idle time, as a portion of the hash data block 350 or the mapping information block 360 is updated (or added), or as a sudden power-off (SPO) is detected.

Referring to a flow of a write operation when a write data miss occurs, in operation S310, the control block 340 may receive a second logical address L2, first data DATA1, and first hash data HD1 with a write command. In operation S320, the control block 340 may search the hash data block 350 by using the first hash data HD1.

In some embodiments, it is assumed that previous hash data are absent from the hash data block 350. Accordingly, the control block 340 may store the first hash data HD1 at any location of the hash data block 350, for example, a location that the first pointer PT1 indicates.

In operation S330, the control block 340 may determine a location of a storage space of the nonvolatile memory device 400, at which the first data DATA1 are to be written in the nonvolatile memory device 400, for example, a location that a first physical address P1 indicates. The control block 340 may update mapping information associated with the received second logical address L2 such that the mapping information associated with the second logical address L2 indicates the first physical address P1, which indicates a location of a storage space where the first data DATA1 are to be written, and the first pointer PT1 indicating a location where the first hash data HD1 are stored in the hash data block 350.

In operation S340, the control block 340 may write the first data DATA1 in a storage space corresponding to the first physical address P1 of the user area 420 of the nonvolatile memory device 400.

Figure 7:
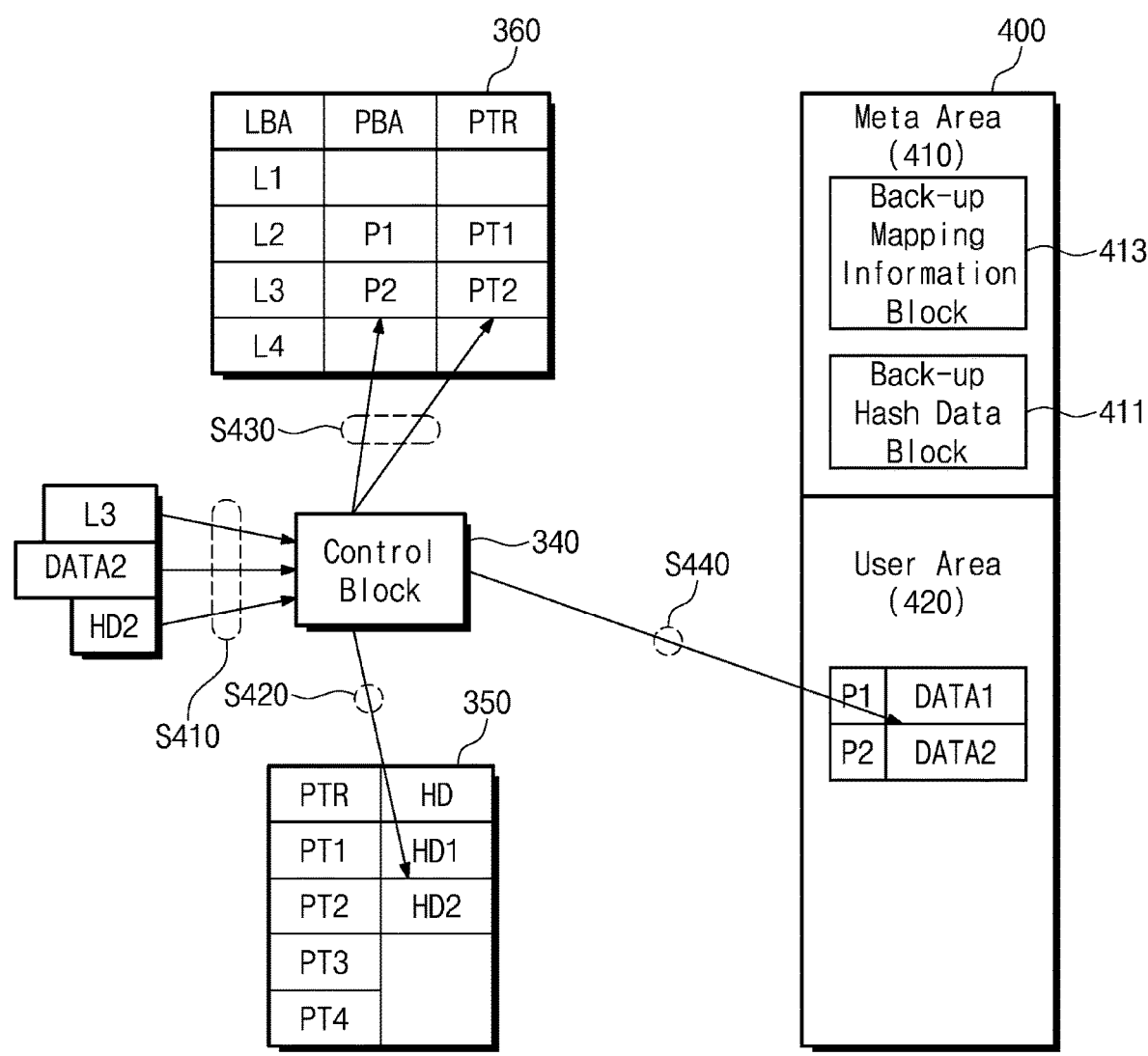
FIG. 7 illustrates an example in which a write data miss occurs in a storage device in a write operation, followed by FIG. 6, according to example embodiments.

FIG. 7 illustrates an example in which a write data miss occurs in the storage device 200 in a write operation, followed by FIG. 6, according to example embodiments. Referring to FIGS. 3, 6, and 7, in operation S410, the control block 340 may receive a third logical address L3, second data DATA2, and second hash data HD2 with a write command. In operation S420, the control block 340 may search the hash data block 350 by using the second hash data HD2.

The first hash data HD1 are present in the hash data block 350. In some embodiments, it is assumed that the second hash data HD2 are different from the first hash data HD1, for example, a similarity between the first hash data HD1 and the second hash data HD2 is smaller than a threshold value. Accordingly, the control block 340 may store the second hash data HD2 at a location of the hash data block 350, for example, the location that the second pointer PT2 indicates.

In operation S430, the control block 340 may determine a location of a storage space of the nonvolatile memory device 400, at which the second data DATA2 are to be written in the nonvolatile memory device 400, for example, a location that a second physical address P2 indicates. The control block 340 may update mapping information associated with the received third logical address L3 such that the mapping information associated with the third logical address L3 indicates the second physical address P2, which indicates a location of a storage space where the second data DATA2 are to be written, and the second pointer PT2 which indicates a location where the second hash data HD2 are stored in the hash data block 350.

In operation S440, the control block 340 may write the second data DATA2 in a storage space corresponding to the second physical address P2 of the user area 420 of the nonvolatile memory device 400.

Figure 8:
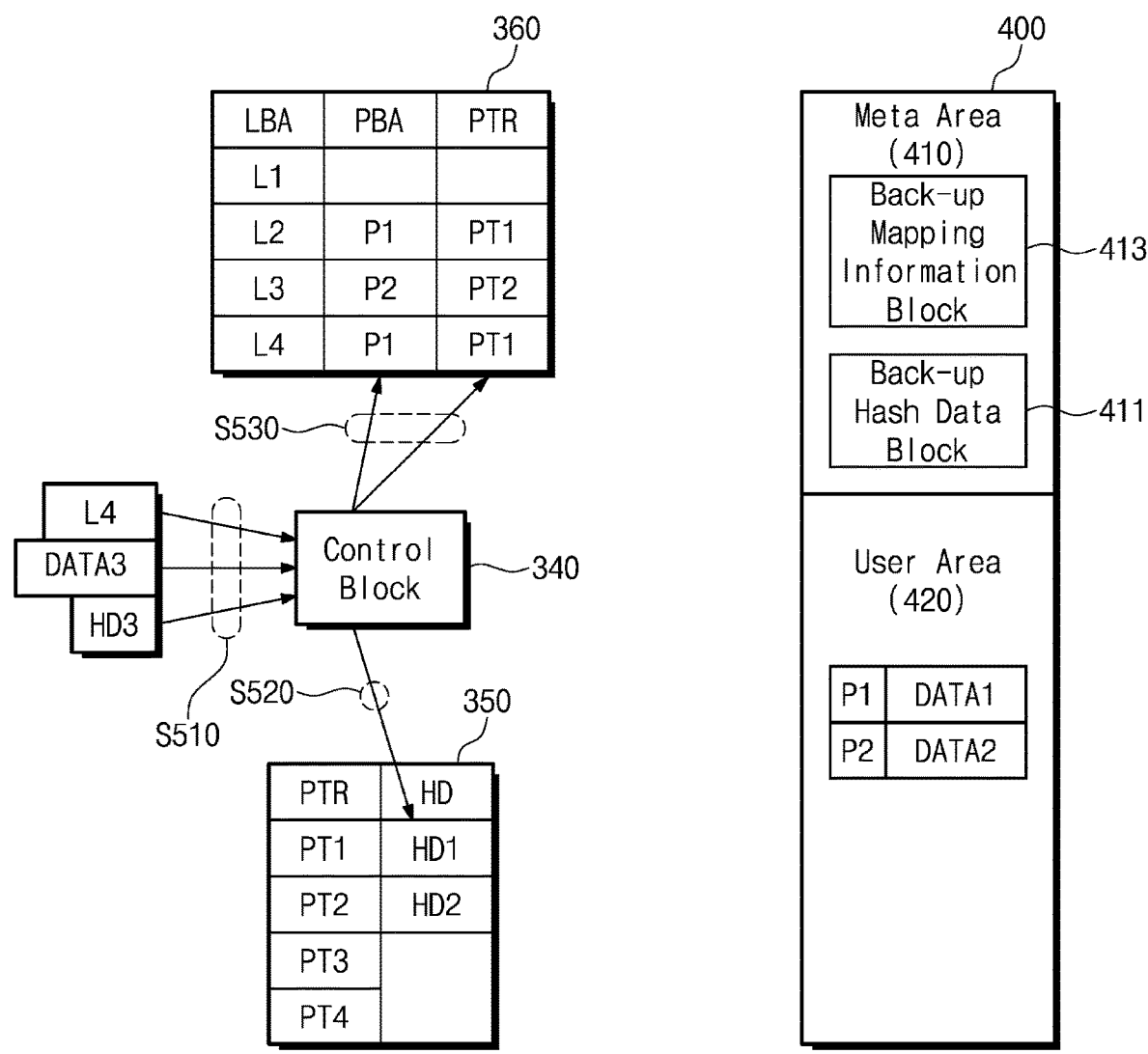
FIG. 8 illustrates an example in which a write data hit occurs in a storage device in a write operation, followed by FIG. 7, according to example embodiments.

FIG. 8 illustrates an example in which a write data hit occurs in the storage device 200 in a write operation, followed by FIG. 7, according to example embodiments. Referring to FIGS. 3, 7, and 8, in operation S510, the control block 340 may receive a fourth logical address L4, third data DATA3, and third hash data HD3 with a write command. In operation S520, the control block 340 may search the hash data block 350 by using the third hash data HD3.

The first hash data HD1 and the second hash data HD2 are present in hash data block 350. In some embodiments, it is assumed that the third hash data HD3 are the same as the first hash data HD1, for example, a similarity between the first hash data HD1 and the third hash data HD3 is the threshold value or greater than the threshold value. Accordingly, the control block 340 may discard the third hash data HD3.

In operation S530, the control block 340 may update mapping information associated with the received fourth logical address L4 such that the mapping information associated with the fourth logical address L4 indicates the first physical address P1, which indicates the location of the storage space where the first data DATA1 are written, and the first pointer PT1 which indicates the location where the first hash data HD1 are stored. For example, an operation of writing the third data DATA3 may be skipped.

Figure 9:
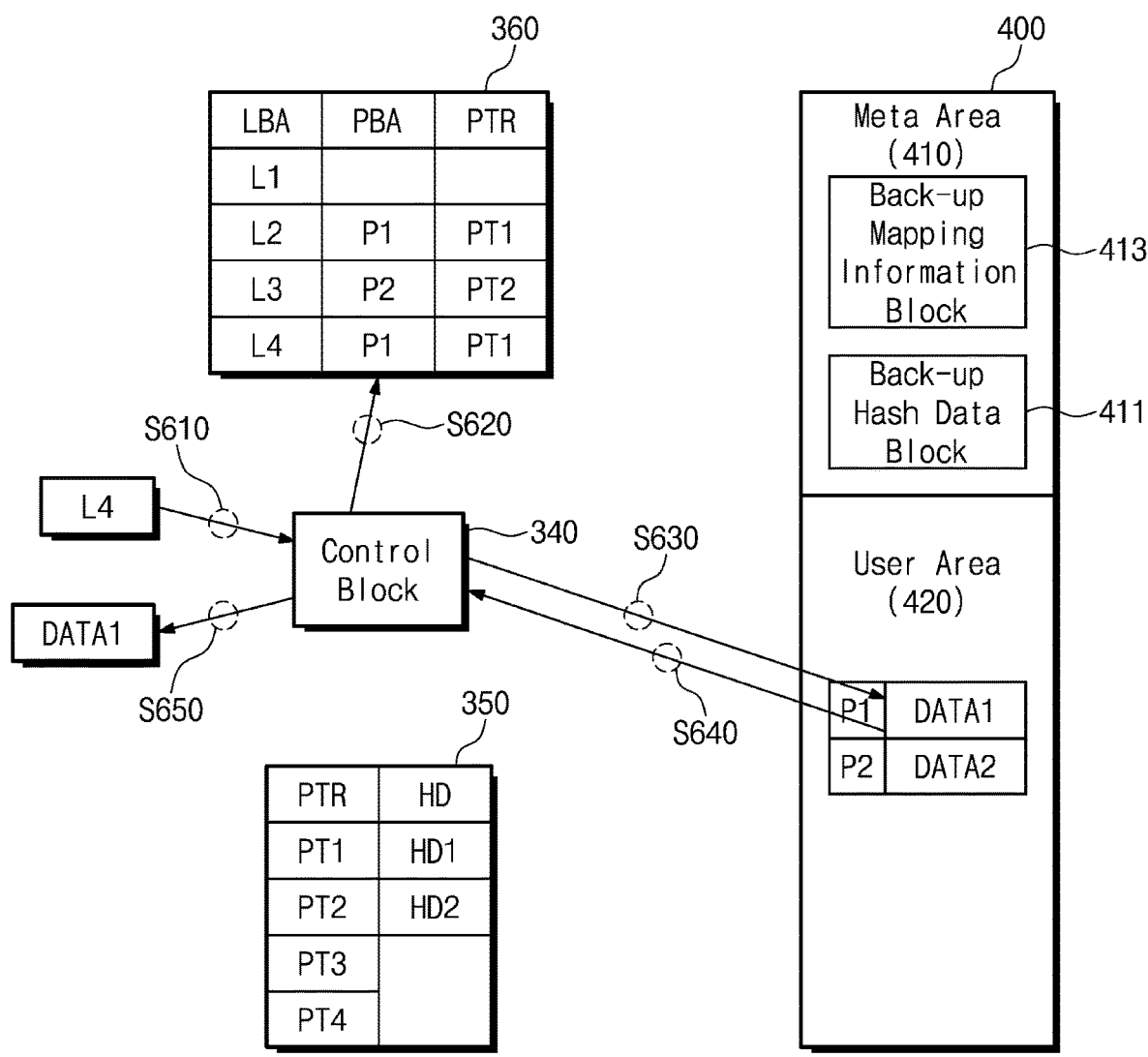
FIG. 9 illustrates an example in which a read operation is performed on data where a write data hit occurs in a storage device in a write operation, followed by FIG. 8, according to example embodiments.

FIG. 9 illustrates an example in which a read operation is performed on data where a write data hit occurs in a write operation in the storage device 200, followed by FIG. 8, according to example embodiments. Referring to FIGS. 3, 8, and 9, in operation S610, the control block 340 may receive the fourth logical address L4 with a read command. In operation S620, the control block 340 may search the mapping information block 360 by using the fourth logical address L4.

The control block 340 may obtain the first physical address P1 associated with the fourth logical address L4 from the mapping information block 360. In operation S630, the control block 340 may transmit the first physical address P1 to the nonvolatile memory device 400 together with a read command.

In operation S640, the control block 340 may read the first data DATA1 from the user area 420 of the nonvolatile memory device 400 by using the first physical address P1 and the nonvolatile memory device 400 may transmit the first data DATA1 to the control block 340. In operation S650, the control block 340 may provide the first data DATA1 to the host device 100.

Figure 10:
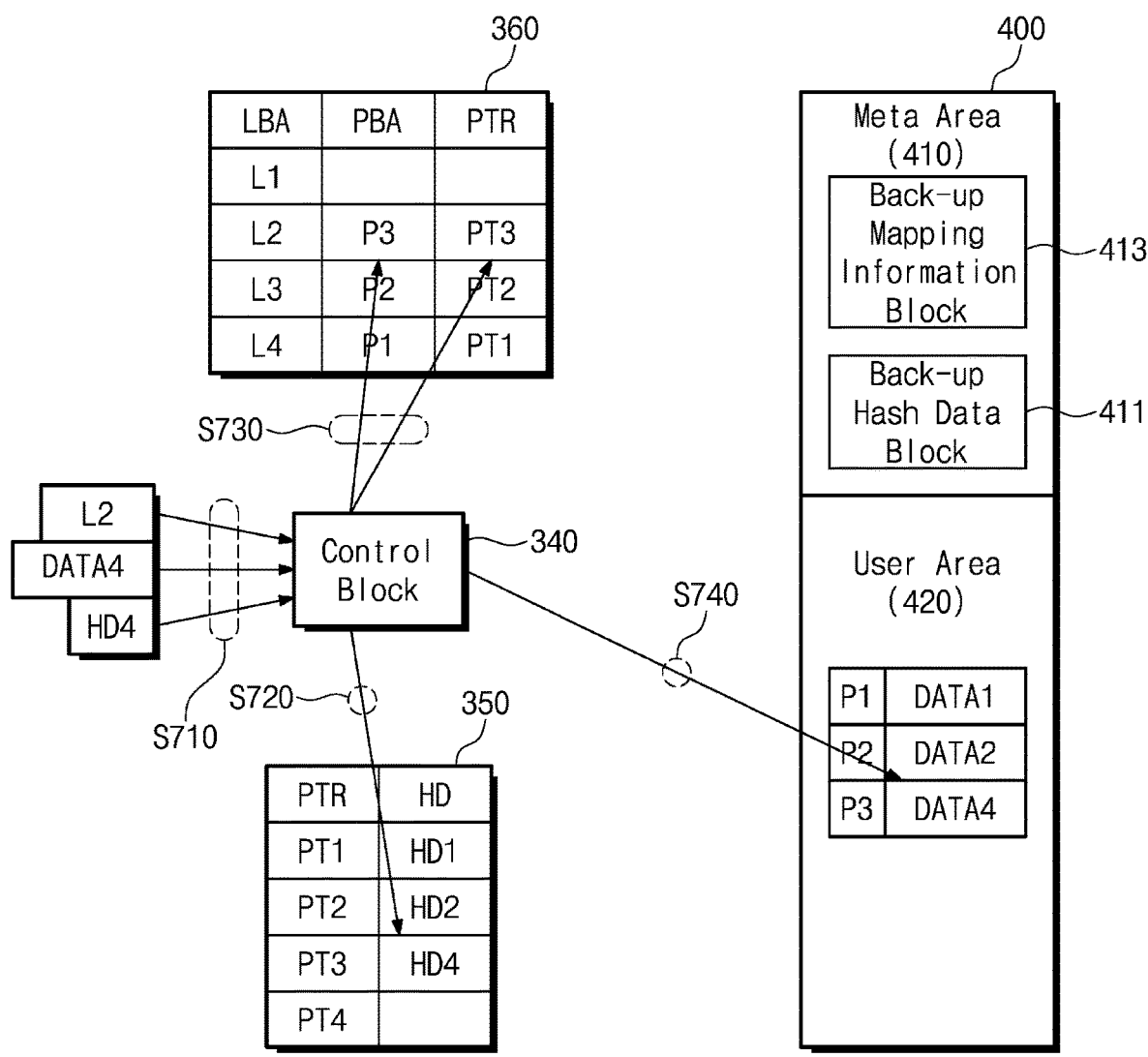
FIG. 10 is a diagram illustrating an example in which data associated with two or more mapping information are updated, followed by FIG. 9, according to example embodiments.

FIG. 10 is a diagram illustrating an example in which data associated with two or more mapping information are updated, followed by FIG. 9, according to example embodiments. Referring to FIGS. 3, 9, and 10, in operation S710, the control block 340 may receive the second logical address L2, fourth data DATA4, and fourth hash data HD4 with a write command. In operation S720, the control block 340 may search the hash data block 350 by using the fourth hash data HD4.

The first hash data HD1 and the second hash data HD2 are present in the hash data block 350. In some embodiments, it is assumed that the fourth hash data HD4 are different from the first hash data HD1 and the second hash data HD2. Accordingly, the control block 340 may store the fourth hash data HD4 at a location of the hash data block 350, for example, the location that the third pointer PT3 indicates.

In operation S730, the control block 340 may determine a location of a storage space of the nonvolatile memory device 400, at which the fourth data DATA4 are to be written, for example, the location that a third physical address P3 indicates. The control block 340 may update mapping information associated with the received second logical address L2 such that the mapping information associated with the second logical address L2 indicates the third physical address P3, which indicates the location of a storage space where the fourth data DATA4 are to be written, and the third pointer PT3 which indicates the location where the fourth hash data HD4 are stored.

In operation S740, the control block 340 may write the fourth data DATA4 in the storage space corresponding to the third physical address P3 of the user area 420.

When at least one mapping information of the mapping information block 360 indicates a particular pointer and a particular physical address, hash data of the particular pointer and data of the particular physical address may be validly maintained. When there is no mapping information indicating the particular pointer and the particular physical address, hash data of the particular pointer and data of the particular physical address may be invalidated.

In some embodiments, when a garbage collection operation is performed as a background operation, invalid data may be deleted. When the invalid data are deleted, hash data associated with the invalid data may be also deleted. Invalid data and invalid hash data may be maintained until the garbage collection operation is performed as a background operation.

In some embodiments, in a write operation, the control block 340 may compare the hash data HD with invalid hash data (previous invalid hash data) of previous hash data. When a write data hit occurs with regard to the previous invalid hash data, the previous invalid hash data and invalid data associated with the previous invalid hash data may be recovered to a valid state.

In some embodiments, to set hash data and data to be invalid or to recover hash data and data to be valid does not require a separate write operation and a separate erase operation. Accordingly, as invalid hash data and invalid data are maintained and a write data hit is determined with regard to invalid hash data, a speed at which the nonvolatile memory device 400 is worn out may decrease, and the lifespan of the storage device 200 may be further extended.

Figure 11:
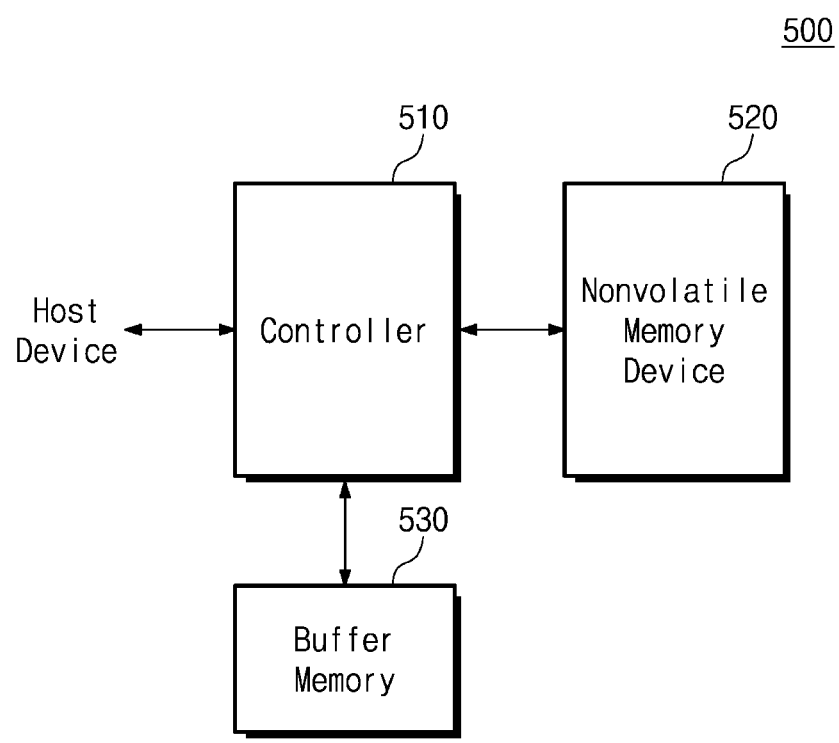
FIG. 11 is a block diagram illustrating a storage device according to some embodiments of the inventive concept.

FIG. 11 is a block diagram illustrating a storage device 500 according to some embodiments of the inventive concept. Referring to FIG. 11, the storage device 500 includes a controller 510, a nonvolatile memory device 520, and a buffer memory 530.

The controller 510 may communicate with an external host device (e.g., the host device 10 of FIG. 1 or the host device 100 of FIG. 3). The controller 510 may control the nonvolatile memory device 520 depending on a request of the external host device. The controller 510 may correspond to the controller 300 of FIG. 1 or the controller 300 of FIG. 3. The nonvolatile memory device 520 may correspond to the nonvolatile memory device 40 of FIG. 1 or the nonvolatile memory device 400 of FIG. 3.

Compared with the storage device 200 of FIG. 3, the storage device 500 may further include the buffer memory 530. The buffer memory 530 may include a random access memory such as a DRAM or a SRAM. The controller 510 may use the buffer memory 530 as a data buffer between the external host device and the nonvolatile memory device 520.

For example, the controller 510 may temporarily store data, which are provided from the external host device so as to be written in the nonvolatile memory device 520, in the buffer memory 530. The controller 510 may temporarily store data in the buffer memory 530 to be transferred from the nonvolatile memory device 520 to the external host device.

In some embodiments, the controller 510 may be configured to store information of at least one of the hash data block 350 (refer to FIG. 3) and the mapping information block 360 (refer to FIG. 3) in the buffer memory 530.

Figure 12:
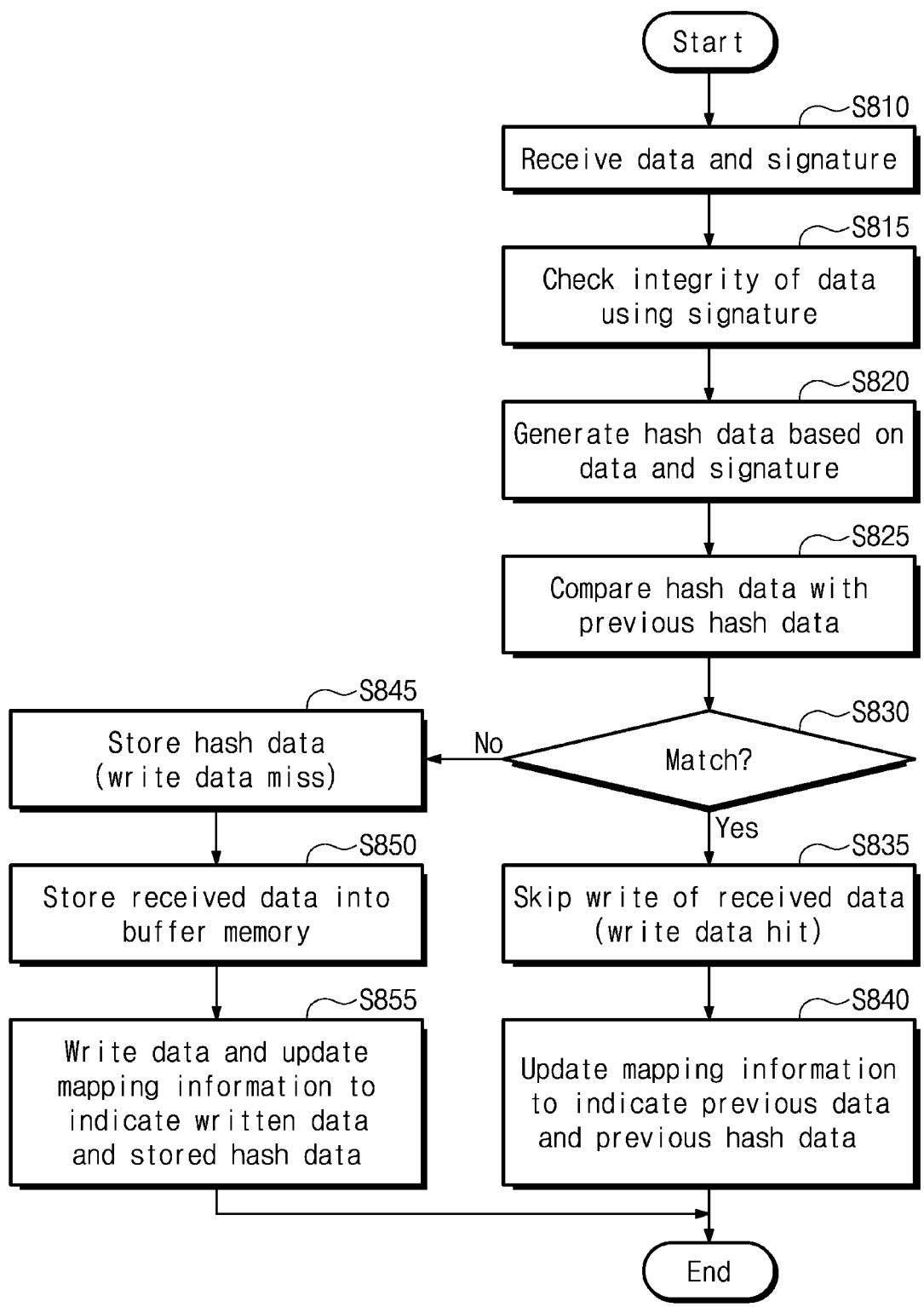
FIG. 12 is a flowchart illustrating a first example of an operating method of a storage device according to example embodiments.

FIG. 12 is a flowchart illustrating a first example of an operating method of the storage device 500 according to example embodiments. Referring to FIGS. 11 and 12, in operation S810, the controller 510 may receive data and a signature. In operation S815, the controller 510 may check the integrity of the data by using the signature. In operation S820, the controller 510 may generate hash data based on the data and the signature. Operations S810, S815, and S820 correspond to operations S110, S120, and S130 of FIG. 2. Thus, additional description will be omitted to avoid redundancy.

In operation S825, the controller 510 may compare the hash data with previous hash data. In operation S830, the controller 510 may determine a write data hit or a write data miss. When the write data hit is determined, in operation S835, the controller 510 may skip a write operation associated with the received data. In operation S840, the controller 510 may update mapping information so as to indicate previous data and previous hash data associated with the received logical address. Operations S830, S835, and S840 correspond to operations S230, S240, and S250 of FIG. 5. Thus, additional description will be omitted to avoid redundancy.

When the write data miss is determined, in operation S845, the controller 510 may store the hash data. Operation S845 corresponds to operation S260 of FIG. 5. Thus, additional description will be omitted to avoid redundancy.

In operation S850, the controller 510 may store the received data in the buffer memory 530. For example, the controller 510 may determine the write data hit or the write data miss before storing the data in the buffer memory 530. The controller 510 may store, in the buffer memory 530, data where the write data miss occurs, that is, only data to be written in the nonvolatile memory device 520.

Afterwards, when a write condition (or, a specific condition) is satisfied, the controller 510 may perform operation S855. In operation S855, the controller 510 may read the data from the buffer memory 530 and may write the read data in the nonvolatile memory device 520. Also, the controller 510 may update mapping information so as to indicate the written data and the stored hash data. Operation S855 corresponds to operation S270 of FIG. 5. Thus, additional description will be omitted to avoid redundancy.

In some embodiments, the write condition may include receiving a flush command from an external host device, detecting a sudden power-off (SPO), entering a power saving mode (or an idle mode) by detecting that a pending command received from the external host device does not exist or by the external host device, and detecting that a free capacity (or a ratio of a free capacity) of the buffer memory 530 is smaller than a threshold value.

Referring to FIGS. 3, 11, and 12, the control block 340 may discard data and hash data where the write data hit occurs. The control block 340 may store, in the buffer memory 530, the data where the write data miss occurs and may store the hash data in the hash data block 350. When the write condition is satisfied, the control block 340 may read the data from the buffer memory 530 and may write the read data in the nonvolatile memory device 520.

Figure 13:
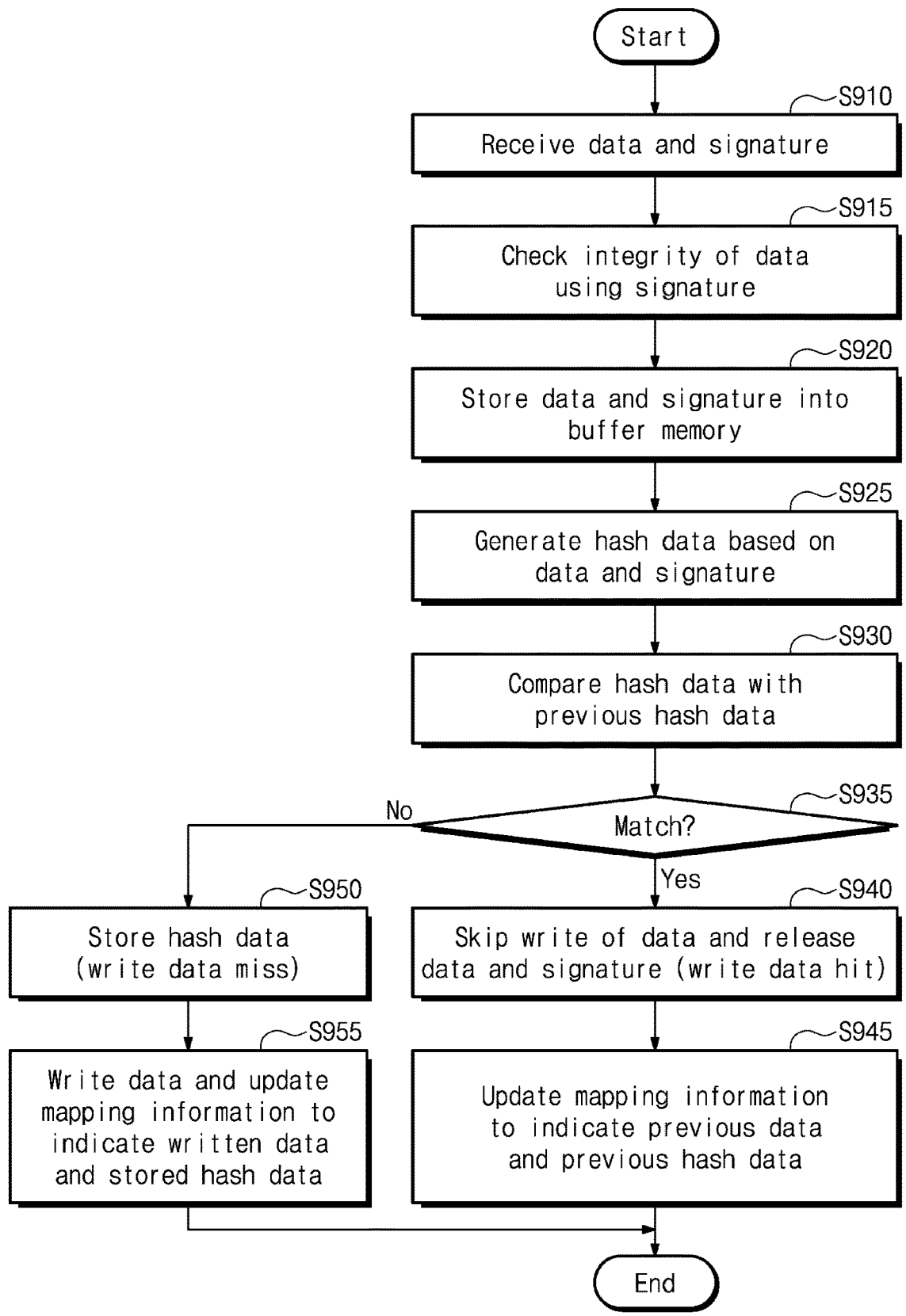
FIG. 13 is a flowchart illustrating a second example of an operating method of a storage device according to example embodiments.

FIG. 13 is a flowchart illustrating a second example of an operating method of the storage device 500 according to example embodiments. Referring to FIGS. 11 and 13, in operation S910, the controller 510 may receive data and a signature. In operation S915, the controller 510 may check the integrity of the data by using the signature. Operation S910 and operation S915 correspond to operation S110 and operation S120 of FIG. 2. Thus, additional description will be omitted to avoid redundancy.

In operation S920, the controller 510 may store the received data and the signature in the buffer memory 530. For example, the controller 510 may not determine a hit or a miss of the received data and signature and may first store the received data and signature in the buffer memory 530. Afterwards, when a write condition is satisfied, the controller 510 may read the data and signature from the buffer memory 530 and may perform operation S925.

Referring to FIGS. 3, 11, and 13, the controller 510 may store the fifth write data WD5 output from the signature check block 320 in the buffer memory 530. When the write condition is satisfied, the controller 510 may read the fifth write data WD5 from the buffer memory 530 and may provide the fifth write data WD5 to the hash generation block 330.

Continuing to refer to FIGS. 11 and 13, when the write condition is satisfied, the controller 510 may perform operation S925. In operation S925, the controller 510 may generate hash data based on the data and the signature. Operation S925 corresponds to operation S130 of FIG. 2. Thus, additional description will be omitted to avoid redundancy.

In operation S930, the controller 510 may compare the hash data with previous hash data. In operation S935, the controller 510 may determine a write data hit or a write data miss. When the write data hit is determined, in operation S940, the controller 510 may skip a write operation associated with the received data.

The controller 510 may discard the data and the signature by releasing a storage space of the buffer memory 530, which is allocated to store the data and the signature. In operation S945, the controller 510 may update mapping information so as to indicate previous data and previous hash data associated with the received logical address. Operations S930, S935, S940, and S945 correspond to operations S220, S230, S240, and S250 of FIG. 5. Thus, additional description will be omitted to avoid redundancy.

When the write data miss is determined, in operation S950, the controller 510 may store the hash data. In operation S955, the controller 510 may write data in the nonvolatile memory device 520. Also, the controller 510 may update mapping information so as to indicate the written data and the stored hash data. Operation S950 and operation S955 correspond to operation S260 and operation S270 of FIG. 5. Thus, additional description will be omitted to avoid redundancy.

In some embodiments, the write condition may include receiving a flush command from an external host device, detecting a sudden power-off (SPO), entering a power saving mode (or an idle mode) by detecting that a pending command received from the external host device does not exist or by the external host device, and detecting that a free capacity (or a ratio of a free capacity) of the buffer memory 530 is smaller than a threshold value.

As described above, components of the storage device 20, 200, or 500 are described by using the terms "first", "second", "third", and the like. However, the terms "first", "second", "third", and the like may be used to distinguish components from each other and do not limit the inventive concept. For example, the terms "first", "second", "third", and the like do not involve an order or a numerical meaning of any form.

In the above embodiments, components according to embodiments of the inventive concept are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits enrolled as circuits or intellectual property (IP) implemented with semiconductor elements in an integrated circuit.

According to some embodiments of the inventive concept, a storage device generates hash data from data and a signature and prevents an overwrite operation by using the hash data. Because a characteristic of the hash data is high, data are prevented from being lost due to overwriting prevention. Accordingly, a storage device that makes a wear slow while maintaining reliability and an operating method of the storage device are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A storage device comprising:
a nonvolatile memory device; and
a controller configured to:
receive a write command, data, and a signature associated with the data from an external device,
generate a first hash value from the data, a second hash value from the signature, and an output hash value based on the first hash value and the second hash value, and
detect whether the data received from the external device are previously written in the nonvolatile memory device, by using the output hash value.

2. The storage device of claim 1, wherein the controller is further configured to check an integrity of the data received from the external device by using the signature.

3. The storage device of claim 1, wherein the signature includes at least one of a cyclic redundancy check (CRC) code, a checksum code, an error detection code (EDC), an error correction code (ECC), and a hash value.

4. The storage device of claim 1, wherein the controller includes:
a first hash generator configured to generate the first hash value from the data;
a second hash generator configured to generate the second hash value from the signature; and
a combination logic configured to combine the first hash value and the second hash value to generate the output hash value.

5. The storage device of claim 4, wherein the combination logic is configured to generate the output hash value by:
arranging the first hash value and the second hash value sequentially,
performing a hash operation on a result of arranging the first hash value and the second hash value sequentially,
performing a logical operation on the first hash value and the second hash value, or
performing a hash operation on a result of a logical operation on the first hash value and the second hash value.

6. The storage device of claim 1, wherein the controller is further configured to:
determine a similarity by comparing the output hash value and previous output hash value of data previously written in the nonvolatile memory device;
determine a write data hit when the similarity is a threshold value or greater than the threshold value; and
skip an operation of writing the data received from the external device in the nonvolatile memory device when the write data hit is determined.

7. The storage device of claim 6, wherein, when the write data hit is determined, the controller stores information indicating that the data received from the external device are present in the nonvolatile memory device as the previously written data.

8. The storage device of claim 6, wherein, when the write data hit is determined, the controller discards the output hash value.

9. The storage device of claim 1, wherein the controller is further configured to:
determine a similarity by comparing the output hash value and previous output hash value of data previously written in the nonvolatile memory device;
determine a write data miss when the similarity is smaller than a threshold value; and
write the data received from the external device in the nonvolatile memory device when the write data miss is determined.

10. The storage device of claim 9, wherein, when the write data miss is determined, the controller stores an address of the nonvolatile memory device, at which the data received from the external device are written.

11. The storage device of claim 9, wherein, when the write data miss is determined, the controller stores the output hash value.

12. The storage device of claim 11, wherein the controller is further configured to back up the output hash value to the nonvolatile memory device.

13. The storage device of claim 1, further comprising:
a buffer memory,
wherein the controller is further configured to:
determine a similarity by comparing the output hash value and previous output hash value of data previously written in the nonvolatile memory device;
determine a write data miss when the similarity is smaller than a threshold value; and
store the data received from the external device in the buffer memory when the write data miss is determined.

14. The storage device of claim 13, wherein, when a specific condition is satisfied, the controller reads the data stored in the buffer memory and writes the data read from the buffer memory in the nonvolatile memory device.

15. The storage device of claim 14, wherein, the specific condition is satisfied when a flush command is received from the external device, when a sudden power-off (SPO) is detected, when the storage device enters an idle state, or when a free capacity of the buffer memory is smaller than a threshold value.

16. The storage device of claim 1, further comprising:
a buffer memory,
wherein the controller is further configured to:
store the data and the signature received from the external device in the buffer memory;
read the data and the signature stored in the buffer memory when a write condition is satisfied; and
generate the first hash value and the second hash value from the data and the signature read from the buffer memory, respectively.

17. The storage device of claim 16, wherein the controller is further configured to:
determine a similarity by comparing the output hash value and previous output hash value of data previously written in the nonvolatile memory device;
determine a write data miss when the similarity is smaller than a threshold value; and
release a storage space of the buffer memory, in which the data and the signature are stored, when the write data miss is determined.

18. An operating method of a storage device which includes a nonvolatile memory device and a controller configured to control the nonvolatile memory device, the method comprising:
receiving, by the controller, a write command, data, and a signature associated with the data from an external device;
generating, by the controller, a first hash value from the data, a second hash value from the signature, and an output hash value from the first hash value and the second hash value;
skipping, by the controller, an operation of writing the data in the nonvolatile memory device when a similarity between the output hash value and previous output hash value of data previously written in the nonvolatile memory device is a threshold value or greater than the threshold value; and
writing, by the controller, the data in the nonvolatile memory device when the similarity between the output hash value and the previous output hash value is smaller than the threshold value.

19. The method of claim 18, further comprising:
checking, by the controller, an integrity of the data by using the signature.

20. A storage device comprising:
a nonvolatile memory device; and
a controller configured to control the nonvolatile memory device,
wherein the controller includes:
a reception block configured to receive a write command, a logical address, data, and a signature associated with the data from an external device;
a signature check block configured to receive the data and the signature from the reception block and to check an integrity of the data by using the signature;
a hash generation block configured to:
receive the data and the signature from the signature check block,
generate a first hash value from the data and a second hash value from the signature, and
generate an output hash value from the first hash value and the second hash value;
a hash data block configured to store previous output hash value associated with previous data previously written in the nonvolatile memory device;
a mapping information block configured to store mapping information between a previous logical address of the previous data and a previous physical address, at which the previous data are written, of a storage space of the nonvolatile memory device; and
a control block configured to receive the data and the output hash value from the hash generation block, to determine a similarity by comparing the output hash value and the previous output hash value of the hash data block, and to determine one of a write data hit and a write data miss depending on the similarity,
wherein, when the write data hit is determined, the control block updates the mapping information block such that the logical address of the data is mapped onto the previous physical address of the previous data, and
wherein, when the write data miss is determined, the controller writes the data in the nonvolatile memory device and updates the mapping information block such that the logical address is mapped onto a physical address, at which the data are written, of a storage space of the nonvolatile memory device.

* * * * *